(12) United States Patent
Dewachter et al.

(10) Patent No.: US 8,609,791 B2
(45) Date of Patent: Dec. 17, 2013

(54) METHOD FOR REPLACING COMPATIBLE ETHYLENE POLYMERIZATION CATALYSTS

(75) Inventors: Daan Dewachter, Mechelen (BE); Martine Slawinski, Nivelles (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 0 days.

(21) Appl. No.: 13/514,101

(22) PCT Filed: Dec. 17, 2010

(86) PCT No.: PCT/EP2010/070023
§ 371 (c)(1),
(2), (4) Date: Jun. 6, 2012

(87) PCT Pub. No.: WO2011/073368
PCT Pub. Date: Jun. 23, 2011

(65) Prior Publication Data
US 2012/0252989 A1    Oct. 4, 2012

(30) Foreign Application Priority Data
Dec. 18, 2009 (EP) .................................. 09179864

(51) Int. Cl.
*C08F 2/00*     (2006.01)
*C08F 4/00*     (2006.01)
*C08F 110/02*   (2006.01)

(52) U.S. Cl.
USPC ................ 526/64; 526/89; 526/352; 526/90

(58) Field of Classification Search
USPC ........................................ 526/64, 89, 90, 352
See application file for complete search history.

(56) References Cited

U.S. PATENT DOCUMENTS

| | | | |
|---|---|---|---|
| 6,284,849 B1 | 9/2001 | Almquist et al. | |
| 2003/0114609 A1 | 6/2003 | Samson | |
| 2004/0138391 A1 | 7/2004 | Burdett et al. | |
| 2005/0272891 A1* | 12/2005 | Fouarge et al. | 526/943 |
| 2009/0143546 A1 | 6/2009 | Fouarge et al. | |

* cited by examiner

*Primary Examiner* — William Cheung

(57) ABSTRACT

The present invention relates to a method for optimizing the sequential feeding of at least two ethylene polymerization catalysts to an ethylene polymerization reactor, comprising:
  transferring to a mixing vessel a first ethylene polymerization catalyst and a first diluent,
  decreasing the concentration of said first ethylene polymerization catalyst in said mixing vessel,
  transferring to said mixing vessel a second ethylene polymerization catalyst and a second diluent,
  progressively replacing said first ethylene polymerization catalyst by said second ethylene polymerization catalyst and said first diluent by said second diluent,
  increasing the concentration of said second ethylene polymerization catalyst in said mixing vessel,
  sequentially transferring said first ethylene polymerization catalyst and said second ethylene polymerization catalyst from said mixing vessel to an ethylene polymerization reactor.

27 Claims, 1 Drawing Sheet

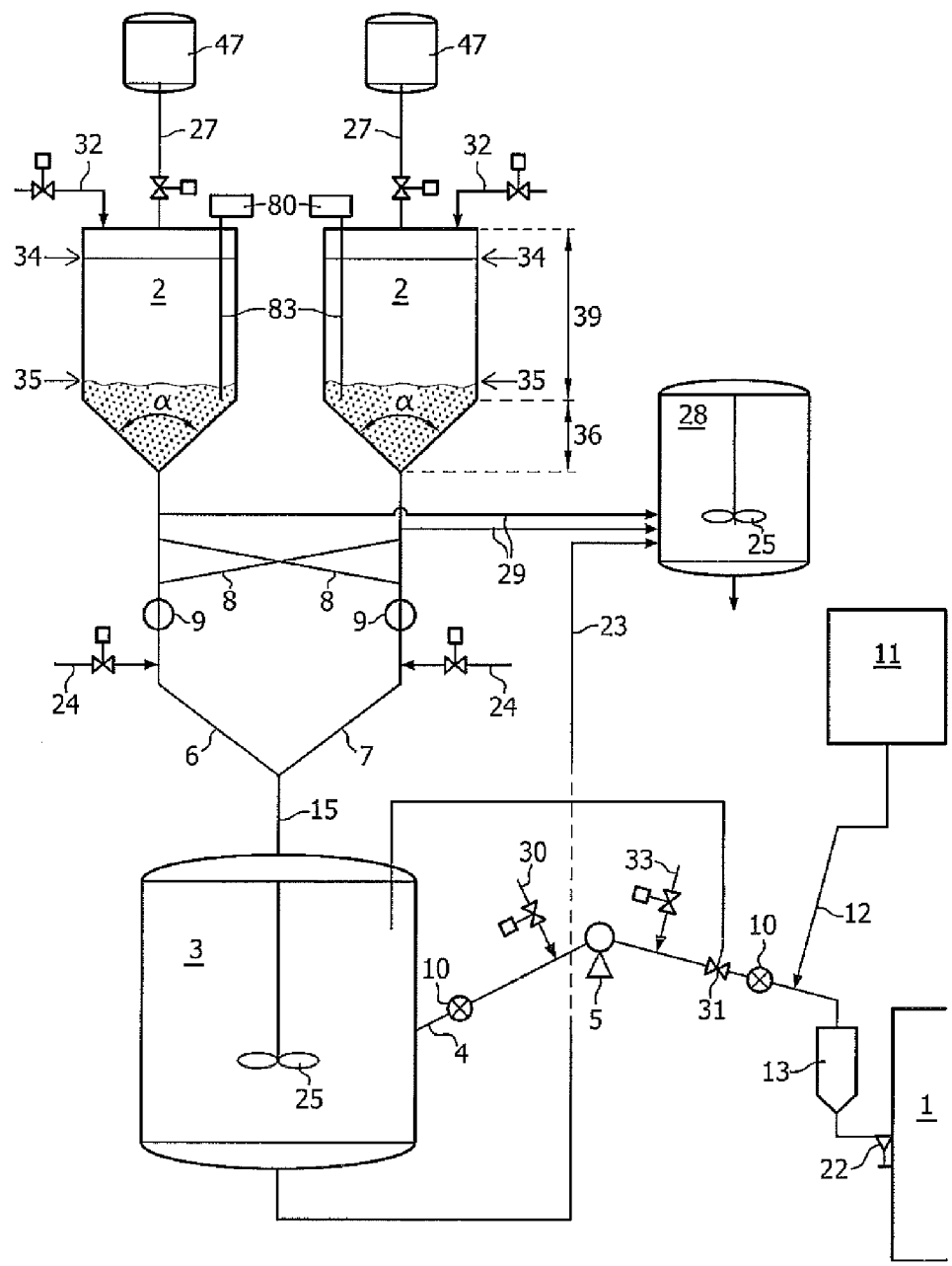

METHOD FOR REPLACING COMPATIBLE ETHYLENE POLYMERIZATION CATALYSTS

CROSS-REFERENCE TO RELATED APPLICATIONS

This application claims the benefit of PCT/EP2010/070023, filed Dec. 17, 2010, which claims priority from EP 09179864.5, filed Dec. 18, 2009.

FIELD OF THE INVENTION

The present invention relates to a method for replacing an ethylene polymerization catalyst with another ethylene polymerization catalyst which is compatible with the previously used ethylene polymerization catalyst. This invention can advantageously be used in chemical manufacturing, specifically in the production of polyethylene.

BACKGROUND OF THE INVENTION

Polyethylene (PE) is synthesized by polymerizing ethylene ($CH_2=CH_2$) monomers. Because it is cheap, safe, stable to most environments and easy to be processed polyethylene polymers are useful in many applications. According to the properties polyethylene can be classified into several types, such as but not limited to LDPE (Low Density Polyethylene), LLDPE (Linear Low Density Polyethylene), and HDPE (High Density Polyethylene). Each type of polyethylene has different properties and characteristics.

Ethylene polymerizations are frequently carried out in a loop reactor using ethylene monomer, liquid diluent and catalyst, optionally one or more co-monomer(s), and hydrogen. The polymerization in a loop reactor is usually performed under slurry conditions, with the produced polymer usually in a form of solid particles which are suspended in the diluent. The slurry in the reactor is circulated continuously with a pump to maintain efficient suspension of the polymer solid particles in the liquid diluent. Polymer slurry is discharged from the loop reactor by means of settling legs, which operate on a batch principle to recover the slurry. Settling in the legs is used to increase the solids concentration of the slurry finally recovered as product slurry. The product slurry is further discharged through heated flash lines to a flash vessel, where most of the diluent and unreacted monomers are flashed off and recycled.

Alternatively, the product slurry may be fed to a second loop reactor serially connected to the first loop reactor wherein a second polymer fraction may be produced. Typically, when two reactors in series are employed in this manner, the resultant polymer product is a bimodal polymer product, which comprises a first polymer fraction produced in the first reactor and a second polymer fraction produced in the second reactor, and has a bimodal molecular weight distribution.

After the polymer product is collected from the reactor and the hydrocarbon residues are removed, the polymer product is dried, additives can be added and finally the polymer may be extruded and pelletized.

During the extrusion process ingredients including polymer product, optional additives, etc, are mixed intimately in order to obtain a compound as homogeneous as possible. Usually, this mixing is done in an extruder wherein the ingredients are mixed together and the polymer product and optionally some of the additives are melted so that intimate mixing can occur. The melt is then extruded into a rod, cooled and granulated, e.g. to form pellets. In this form the resulting compound can then be used for the manufacturing of different objects.

Polymerization of ethylene involves the polymerization of ethylene monomer in the reactor in the presence of a polymerization catalyst and optionally, if required depending on the used catalyst, an activating agent. Suitable catalysts for the preparation of polyethylene, comprise chromium-type catalysts, Ziegler-Natta catalysts and metallocene catalysts. Typically, the catalyst is used in particulate form. The polyethylene is produced as a resin/powder with a hard catalyst particle at the core of each grain of the powder.

Several systems have been disclosed which involve the preparation and the supply of catalyst slurry to a polymerization reaction. In general, for preparing catalyst slurry, a mixture of dry solid particulate catalyst and diluent are apportioned in a catalyst mixing vessel and thoroughly mixed. Then such catalyst slurry is typically transferred to a polymerization reactor for contact with the monomer reactants, generally under high pressure conditions.

It is known in the art that for the production of ethylene polymers having suitable properties it is important to adequately transition between production campaigns using different polymerization catalysts. Inadequate changing from a first to a second catalyst may result in disturbances of a polymerization reactor's steady state regime, long transition periods, production of transition material unsuitable for further use, for instance in an application.

In view of the above, there remains a need in the art for optimizing the sequential feeding of at least two ethylene polymerization catalysts to an ethylene polymerization reactor. The present invention aims to provide a method allowing that a catalyst transitioning process can be improved further.

SUMMARY OF THE INVENTION

The present invention relates to a method for optimizing the sequential feeding of at least two ethylene polymerization catalysts to an ethylene polymerization reactor, as provided by claim 1.

Specifically, the present invention provides a method for optimizing the sequential feeding of at least two ethylene polymerization catalysts to an ethylene polymerization reactor comprising:
  transferring to a mixing vessel a first ethylene polymerization catalyst and a first diluent,
  decreasing the concentration of said first ethylene polymerization catalyst in said mixing vessel,
  transferring to said mixing vessel a second ethylene polymerization catalyst and a second diluent,
  progressively replacing said first ethylene polymerization catalyst by said second ethylene polymerization catalyst and said first diluent by said second diluent,
  increasing the concentration of said second ethylene polymerization catalyst in said mixing vessel,
  sequentially transferring said first ethylene polymerization catalyst and said second ethylene polymerization catalyst from said mixing vessel to an ethylene polymerization reactor.

The above provided method allows transitioning from one type of catalyst to another in the production of ethylene polymer in a commercial reactor. Hence polymers having different properties and characteristics as obtained using another catalyst system may be produced in the same equipment. Transitioning between similar or compatible catalysts is easily achievable.

A transition from a polymerization reaction catalyzed by a first catalyst to a polymerization reaction catalyzed by a second catalyst is usually performed by stopping the polymerization process, empty the reactor, recharging and then introducing the second catalyst into the reactor. Such catalyst changes are time-consuming and costly because a reactor shut-down for an extended period of time is necessary during transition. The method of the present invention allows a polymerization reaction to run without being inhibited or having to be stopped to change catalyst.

Optimization of the catalyst feed to an ethylene polymerization reactor allows the transition time to be kept to a minimum. This is advantageous for reducing the amount of transition product produced. As the transition product is waste material, it is of economical interest to keep it to a minimum, even to avoid it.

These and further aspects and embodiments of the invention are further explained in the following sections and in the claims, as well as illustrated by non-limiting examples.

BRIEF DESCRIPTION OF THE FIGURES

FIG. 1 schematically illustrates a device suitable for carrying out a method according to an embodiment of the invention.

DETAILED DESCRIPTION OF THE INVENTION

Before the present method used in the invention is described, it is to be understood that this invention is not limited to particular methods, components, or devices described, as such methods, components, and devices may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The terms "comprising", "comprises" and "comprised of" also include the term "consisting of".

The recitation of numerical ranges by endpoints includes all numbers and fractions subsumed within the respective ranges, as well as the recited endpoints.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

All documents cited in the present specification are hereby incorporated by reference in their entirety.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The present invention relates to a novel method for optimizing the sequential feeding of at least two ethylene polymerization catalysts to an ethylene polymerization reactor.

As used herein, the "catalyst" refers to a substance that causes a change in the rate of a polymerization reaction without itself being consumed in the reaction. In the present invention it is especially applicable to catalysts suitable for the polymerization of ethylene to polyethylene. These catalysts will be referred to as "ethylene polymerization catalysts". In the present invention it is especially applicable to ethylene polymerization catalysts such as metallocene catalysts and to chromium catalysts.

The term "metallocene catalyst" is used herein to describe any transition metal complexes consisting of metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl (IND), fluorenyl or their derivatives. Use of metallocene catalysts in the polymerization of olefins has various advantages. Metallocene catalysts have high activities and are capable of preparing polymers with enhanced physical properties in comparison with the polymers prepared using Ziegler-Natta catalysts. The key to metallocenes is the structure of the complex. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In a preferred embodiment, the metallocene catalyst has a general formula (I) or (II):

$$(Ar)_2MQ_2 \quad (I); or$$

$$R''(Ar)_2MQ_2 \quad (II)$$

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl (Cp), indenyl (IND), tetrahydroindenyl (THI) or fluorenyl, wherein each of said groups may be optionally substituted with one or more substituents each independently selected from the group consisting of halogen, a hydrosilyl, a $SiR_3$ group wherein R is a hydrocarbyl having 1 to 20 carbon atoms, and a hydrocarbyl having 1 to 20 carbon atoms, and wherein said hydrocarbyl optionally contains one or more atoms selected from the group comprising B, Si, S, O, F, Cl and P;

wherein M is a transition metal selected from the group consisting of titanium, zirconium, hafnium and vanadium; and preferably is zirconium;

wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl and P; and wherein R" is a divalent group or moiety bridging the two Ar groups and selected from the group consisting of a $C_1$-$C_{20}$ alkylene, a germanium, a silicon, a siloxane, an alkylphosphine and an amine, and wherein said R" is optionally substituted with one or more substituents each independently selected from the group consisting of halogen, a hydrosilyl, a $SiR_3$ group wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P.

The term "hydrocarbyl having 1 to 20 carbon atoms" as used herein is intended to refer to a moiety selected from the group comprising a linear or branched $C_1$-$C_{20}$ alkyl; $C_6$-$C_{20}$ cycloalkyl; $C_6$-$C_{20}$ aryl; $C_7$-$C_{20}$ alkylaryl and $C_7$-$C_{20}$ arylalkyl, or any combinations thereof. Exemplary hydrocarbyl groups are methyl, ethyl, propyl, butyl (Bu), amyl, isoamyl, hexyl, isobutyl, heptyl, octyl, nonyl, decyl, cetyl, 2-ethylhexyl, and phenyl. Exemplary halogen atoms include chlorine, bromine, fluorine and iodine and of these halogen atoms, fluorine and chlorine are preferred. Exemplary of the alkylene groups is methylidene, ethylidene and propylidene.

Illustrative examples of metallocene catalysts comprise but are not limited to bis(cyclopentadienyl)zirconium dichloride (Cp2ZrCl2), bis(cyclopentadienyl)titanium dichloride (Cp2TiCl2), bis(cyclopentadienyl)hafnium dichloride (Cp2HfCl2); bis(tetrahydroindenyl)zirconium dichloride, bis(indenyl)zirconium dichloride, and bis(n-butyl-cyclopentadienyl)zirconium dichloride; ethylenebis(4,5,6,7-tetrahydro-1-indenyl)zirconium dichloride, ethylenebis(1-indenyl)zirconium dichloride, dimethylsilylene bis(2-methyl-4-phenyl-inden-1-yl)zirconium dichloride, diphenylmethylene (cyclopentadienyl)(fluoren-9-yl)zirconium dichloride, and dimethylmethylene[1-(4-tert-butyl-2-methyl-cyclopentadienyl)](fluoren-9-yl)zirconium dichloride.

Generally, metallocene catalysts are provided on a solid support. The support should be an inert solid, which is chemically unreactive with any of the components of the conventional metallocene catalyst. The support is preferably a silica compound. In a preferred embodiment, the metallocene catalyst is provided on a solid support, preferably a silica support.

The term "chromium catalysts" refers to catalysts obtained by deposition of chromium oxide on a support, e.g. a silica or aluminium support. Illustrative examples of chromium catalysts comprise but are not limited to $CrSiO2$ or $CrAl2O3$.

By the term "ethylene polymerization" it is meant feeding to a reactor reactants including ethylene monomer, a diluent, a catalyst and optionally a co-monomer, an activating agent and a terminating agent such as hydrogen. A homo-polymer or co-polymer result. The term "co-polymer" refers to a polymer, which is made by linking two different types of in the same polymer chain. The term "homo-polymer" refers to a polymer which is made by linking ethylene monomers, in the absence of co-monomers.

As used herein, the term "diluent" refers to diluents in liquid form that is in a liquid state, liquid at room temperature. Diluents which are suitable for being used in accordance with the present may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. Nonlimiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, the diluent is isobutane. However, it should be clear from the present invention that other diluents may as well be applied according to the present invention.

The term "co-monomer" refers to olefin co-monomers which are suitable for being polymerized with ethylene monomers. Co-monomers may comprise but are not limited to aliphatic C3-C20 alpha-olefins. Examples of suitable aliphatic C3-C20 alpha-olefins include propylene, 1-butene, 4-methyl-1-pentene, 1-hexene, 1-octene, 1-decene, 1-dodecene, 1-tetradecene, 1-hexadecene, 1-octadecene and 1-eicosene.

The term "activating agent" refers to materials that can be used in conjunction with a catalyst in order to improve the activity of the catalyst during the polymerization reaction. In the present invention, it particularly refers to an organoaluminium compound, being optionally halogenated, having general formula AlR1R2R3 or AlR1R2Y, wherein R1, R2, R3 is an alkyl having from 1 to 6 carbon atoms and R1, R2, R3 may be the same or different and wherein Y is hydrogen or a halogen.

The inventors have found an improved method for when a polymerization reaction catalyzed by a first catalyst is to be changed to a polymerization reaction catalyzed by a second catalyst. The method can even be advantageously used when the second catalyst is compatible with the first catalyst. The method is advantageous as it avoids having to kill the existing polymerization reaction, empty the reactor, recharge and start again with a new catalyst. The benefit of this procedure is that the amount of remaining material in the plant from the previous run will be small. Another advantage is that several hours will not have to be spend for building up desired solid levels inside a reactor not having received polymerization catalyst for several hours. The process is not hampered by traces of "old" material, or the requirement of cleaning of the polymerization reactor.

As used herein, the "sequential feeding" refers to a feeding sequence of catalysts, whereby a second catalyst is fed to an ethylene polymerization reactor following a first catalyst. Typical for the present invention is that the sequential feeding allows for a continuous polymer production during catalyst transitioning; that is without interrupting the polymerization reaction.

Transitioning from a first to a second catalyst is executed using a mixing vessel. Use of a mixing vessel allows an initial catalyst slurry to be prepared at a high concentration. This is advantageous for saving space and consequently keeping equipment investments for a polymer plant moderate. Use of a mixing vessel as intermediate between a mud pot and polymerization reactor is also advantageous for providing flexibility to the preparation of a catalyst slurry. It can be diluted down to a desired concentration just prior to injection into a reactor. The concentration can easily be adjusted to the requirements of the polymerization reactor at any given time.

In a first aspect, the invention provides a method for optimizing the sequential feeding of at least two ethylene polymerization catalysts to an ethylene polymerization reactor, comprises the following steps: transferring to a mixing vessel a first ethylene polymerization catalyst and a first diluent, decreasing the concentration of said first ethylene polymerization catalyst in said mixing vessel, transferring to said mixing vessel a second ethylene polymerization catalyst and a second diluent, progressively replacing said first ethylene polymerization catalyst by said second ethylene polymerization catalyst and said first diluent by said second diluent, increasing the concentration of said second ethylene polymerization catalyst in said mixing vessel, and sequentially transferring said first ethylene polymerization catalyst and said second ethylene polymerization catalyst from said mixing vessel to an ethylene polymerization reactor.

The inventors have found that by modifying the rate of diluent used for preparing an ethylene polymerization catalyst slurry, the concentration of catalysts transported in a stream of diluent to a mixing vessel, can be easily modified and adopted. Use of a procedure whereby diluent levels are modified to transfer varying amounts of catalyst is advantageous for optimizing the sequential feeding of at least two ethylene polymerization catalysts to an ethylene polymerization reactor. It allows emptying of mud pots at a constant rate. It provides a simple and straightforward method for switching between catalysts away from the polymerization reactor. It allows continuous production of polyethylene.

In a first step the method of the invention comprises transferring to a mixing vessel a first ethylene polymerization catalyst and a first diluent. A catalyst slurry is formed comprising the first ethylene polymerization catalyst and the first diluent. In case the catalyst slurry and ethylene polymerization catalyst are added to the mixing vessel separately, the catalyst slurry is formed in the mixing vessel. In case the catalyst is transferred to the mixing vessel by means of a conduit to which diluent is added prior to reaching the mixing vessel, the slurry is formed on transport of the first ethylene polymerization catalyst to the mixing vessel.

Next, the concentration of the first ethylene polymerization catalyst in the mixing vessel, is decreased. The concentration of the first ethylene polymerization catalyst in the mixing vessel may be decreased by either directly adding additional diluent to the mixing vessel or by increasing the flow rate of diluent in the conduit transporting the first ethylene polymerization catalyst to the mixing vessel.

Following the dilution of the first ethylene polymerization catalyst in said mixing vessel, a second ethylene polymerization catalyst is transferred to the mixing vessel. In addition a second diluent is transferred to the mixing vessel. Transfer of the second catalyst may be separate from the transfer of the second diluent. Preferably the second catalyst is transferred to the mixing vessel in the second diluent.

The second ethylene polymerization catalyst is progressively replacing the first ethylene polymerization catalyst in the mixing vessel.

Next, the concentration of the second ethylene polymerization catalyst in said mixing vessel is raised. This may be achieved by lowering the amount of second diluent comprised in a slurry comprising the second ethylene polymerization catalyst. Preferably, the rate at which the second diluent is fed to the mixing vessel is decreased to achieve a diluent with an elevated concentration of the second ethylene polymerization catalyst.

In a preferred embodiment, increasing or decreasing a concentration is obtained by increasing or decreasing of the first diluent or the second diluent transferred to the mixing vessel. Preferably, diluting of catalyst slurry is obtained by adding diluent to a conduit transferring said catalyst slurry from said mud pot to said mixing vessel. This is advantageous as the addition of diluent to a conduit provides cleaning. Rinsing conduits with diluent avoids the settling of catalyst particles in the conduits. This is economically more efficient. It is also safer as it avoids exposure of remaining catalyst particles to air upon opening of the conduits for inspection or repairs.

The first ethylene polymerization catalyst in the mixing vessel is being progressively replaced by the second ethylene polymerization catalyst.

During the transition of the first to the second ethylene polymerization catalyst, a catalyst slurry is being fed to an ethylene polymerization reactor. This has for advantage that the reactor is continuously being fed with catalyst required for the polymerization of ethylene. Use of a mixing vessel for the transition between catalysts has for advantage that in case a wrong manipulation takes place, the polymerization process taking place in the reactor is not immediately affected. Transitioning between catalysts using a mixing vessel provides for a buffering step.

In a preferred embodiment, the first diluent is the same as the second diluent. This is advantageous as only one diluent will need to be removed from polyethylene. In a preferred embodiment of a method according to the invention, the above mentioned first and second diluent is a hydrocarbon diluent, preferably isobutane. Isobutane is compatible with solvents used in an ethylene polymerisation process. This is advantageous as removal of the solvent prior to injection of the catalyst into the polymerization reactor is not required. Preferably the method of the invention allows the transitioning between catalysts that are compatible.

By the term "compatible catalysts" it is meant, catalysts having substantially the same performances towards molecular weight regulators, such as hydrogen and co-monomers. Ethylene polymerization reactions carried out using compatible catalysts result in similar molecular weight distribution and/or co-monomer incorporation. Blending of two polymer grades made at the same conditions will not generate gels.

Examples of compatible catalyst pairs are chromium catalysts with chromium catalysts, chromium catalysts with Ziegler-Natta catalysts; Ziegler-Natta catalysts with Ziegler-Natta catalysts, and some metallocene catalysts with some other metallocene catalysts. Metallocene catalysts that are considered compatible are Et(THI)2ZrCl2 and Et(IND)2ZrCl2. Et(THI)2ZrCl2 and (nBuCp)2ZrCl2 are also considered compatible.

In a preferred embodiment, the first ethylene polymerization catalysts and the second ethylene polymerization catalyst are selected from a list consisting of a metallocene catalyst, a Ziegler-Natta catalyst and a chromium catalyst, and whereby the first ethylene polymerization catalyst is different from the second ethylene polymerization catalyst; preferably either the first ethylene polymerization catalysts or the second ethylene polymerization catalyst is a single site catalyst, more preferably a metallocene catalyst, most preferably a carrier supported metallocene catalyst.

Metallocene type catalysts are presently of great economic importance. Being able to use them in a campaign before and/or after chromium-based catalyst or Ziegler-Natta type catalyst, in the same polymerization equipment, using a method providing a time-saving transitioning is highly advantageous.

In a preferred embodiment, either the first ethylene polymerization catalyst and the first diluent or the second ethylene polymerization catalyst and the second diluent are a metallocene catalyst in isobutane. The selection of a metallocene catalyst in isobutane diluent is advantageous as metallocene catalysts mixed with isobutane diluent were found to provide free flowing slurries. They can be easily handled and transported. Isobutane is a relatively cheap solvent. After polymerization of ethylene, isobutane may be removed easily, due to its relatively low boiling point. For the removal of isobutane from polyethylene, isobutane flushing means may be used.

In the case of transition from a chromium catalyst, the transition is followed by infrared measurements on the produced polymer to determine when the system is free from any chromium-based polymer, i.e. to determine when the produced polymer is within the metallocene polymer specifications. The transition can also be followed by melt index measurements of the produced polymer fluff.

In a preferred embodiment, decreasing the concentration of the first ethylene polymerization catalyst in the mixing vessel is obtained by increasing the relative amount of the first diluent to the first ethylene polymerization catalyst in the mixing vessel.

In a preferred embodiment, increasing the concentration of the second ethylene polymerization catalyst in the mixing vessel, is obtained by lowering the relative amount of the second diluent to the second ethylene polymerization catalyst in the mixing vessel.

In a preferred embodiment, the first and/or the second diluent is injected into a conduit for transferring the first ethylene polymerization catalyst and/or the second ethylene polymerization catalyst to the mixing vessel.

Preferably, catalyst slurry dilution is obtained by diluting the catalyst slurry from the mud pot by means of hydrocarbon diluent to a concentration between 0.1% and 10% by weight. More preferably the slurry is diluted in a hydrocarbon diluent to a concentration comprised between 0.1% and 4% by weight, more preferred between 0.1 and 1%, and even more preferred of 0.5% by weight. The mixing vessel is preferably provided with a stirrer for maintaining the homogeneity of the slurry. This is advantageous for the stability of the reactor conditions in the polymerization reactor receiving said diluted catalyst slurry. Preferably said diluent for dilution of the slurry from the mud pot is isobutane.

In a preferred embodiment, the first ethylene polymerization catalyst is replaced by the second ethylene polymerization catalyst upon reaching a pre-set catalyst concentration in the mixing vessel suitable for polymerizing ethylene.

In a preferred embodiment, the pre-set catalyst concentration is a catalyst concentration, expressed per weight of diluent in the mixing vessel, of between 0.05 and 2.9 weight percent, more preferably between 0.1 and 0.3 weight percent, most preferably 0.2 weight percent. This selection provides an ethylene polymerization reactor with a minimal concentration of catalyst for the polymerization of ethylene. This is advantageous as the reactor will not need to be shut-down.

In a preferred embodiment, a method according to the invention further comprises the step of lowering ethylene in the ethylene polymerization reactor prior to progressively replacing the first ethylene polymerization catalyst by the second ethylene polymerization catalyst. In case the second polymerization catalyst is more active, a replacement of catalyst will not lead to an increase in reactivity as the raw material level was lowered. The step of lowering ethylene prior to feeding a catalyst with another polymerization catalyst is a safety precaution.

In a preferred embodiment, a method according to the invention further comprises the step of transferring the first ethylene polymerization catalyst and/or the second ethylene polymerization catalyst from the mixing vessel to the ethylene polymerization reactor at a flow rate adjusted to the ethylene. It is advantageous to match the amount of catalyst fed to a polymerization reactor to the amount of reactants, here ethylene, present in a reactor. This is economically advantageous as excess ethylene is avoided. Run-away conditions are avoided. A polymerization reactor can be kept in steady-state operating condition.

In a preferred embodiment the ethylene is lowered by at least two percent, preferably at least 5 percent, more preferably at most 10 percent. Having to lower the ethylene feed to a polymerization reactor by only a small increment, has for advantage that the reaction conditions are barely changed. This is advantageous for maintaining steady-state conditions in the reactor.

By the term "steady-state condition" it is meant that the polymerization reaction can be kept in a stable condition that does not change over time or in which change in one direction is continually balanced by change in another. In this invention, it means in particular that the polymerization reaction exhibits only negligible change.

In a preferred embodiment, a method according to the invention further comprises the step of lowering hydrogen and/or co-monomer in the ethylene polymerization reactor. This is advantageous as excess reactants are avoided; hence waste streams are reduced to a minimum.

In a preferred embodiment, the first ethylene polymerization catalyst is replaced by the second ethylene polymerization catalyst within at most 2 hours, preferably at most 1.5 hours, most preferably at most 1 hour. A short transition period, in particular in the range of hours, is advantageous as it reduces capacity loss to minimum.

The present invention is applicable to any slurry polymerization in a liquid medium. The invention is particularly applicable to olefin polymerizations in a liquid diluent in which the resulting polymer is mostly insoluble under polymerization conditions. Most particularly the invention is applicable to any olefin polymerization utilizing a diluent so as to produce a slurry of polymer solids and liquid diluent. Suitable olefin monomers are 1-olefins having up to 8 carbon atoms per molecule and no branching nearer the double bond than the 4-position.

In a preferred embodiment of the invention, the above mentioned catalyst slurry is transferred to an ethylene polymerization reactor. In a preferred embodiment of the invention, the above mentioned catalyst slurry is transferred to an ethylene co-polymerization reactor.

The invention is particularly suitable for the copolymerization of ethylene and a higher 1-olefin such as 1-butene, 1-pentene, 1-hexene, 1-octene and 1-decene. For example, copolymers can be made from ethylene and 0.01 to 10 weight percent, alternatively 0.01 to 5 weight percent, alternatively 0.1 to 4 weight percent higher olefin based on the total weight of ethylene and co-monomer. Alternatively sufficient co-monomer can be used to give the above-described amounts of co-monomer incorporation in the polymer. Suitable diluents for use as the liquid medium in a loop reactor are well known in the art and include hydrocarbons, which are inert and liquid under reaction conditions. Suitable hydrocarbons include isobutane, propane, n-pentane, i-pentane, neopentane and n-hexane, with isobutane being especially preferred.

In a preferred embodiment, sequentially transferring the first ethylene polymerization catalyst and the second ethylene polymerization catalyst is providing the ethylene polymerization reactor, preferably a double loop reactor, with a catalyst concentration suitable for the production of polyethylene, preferably bimodal polyethylene, when producing the polyethylene.

The present invention is particularly applicable to any ethylene polymerization reaction in a loop reactor. A so-called loop reactor is well known and is described in the Encyclopaedia of Chemical Technology, 3rd edition, vol. 16 page 390. Additional details regarding loop reactor apparatus and polymerization processes may be found in US 200910143546. A loop reactor consist of a long pipe, arranged in one or more, typically two loops, each loop being tens of meters high. The diameter of the pipes is typically around 60 cm. Such an arrangement has a large surface area: volume ratio as compared with a conventional flask or vessel arrangement. This ensures that there is sufficient surface area to the reaction vessel to allow heat exchange with the outer environment, thus reducing the temperature inside the reactor. This makes it particularly suitable for polymerization reactions which are exothermic and require extensive cooling. The configuration is also advantageous as it provides a lot of room for the installation of a cooling system, usually water jackets. This serves to efficiently carry away heat from the surface of the reactor, to increase the efficiency of cooling.

Loop reactors may be connected in parallel or in series. The present invention is particularly applicably to a pair of loop reactors connected in series. When the two reactors are connected in series, different reaction conditions can be used in the reactors allowing the production of several types of products using the same installation. Bimodal polymers may be produced by producing a high molecular weight polymer fraction in a first loop reactor and a low molecular weight polymer fraction in a second loop reactor.

Diluted catalyst slurry is withdrawn from the mixing vessel through one or more conduits and provided through these conduits to a polymerization reactor. Each conduit is provided with a pumping means, which controls the transfer and injection of the catalyst slurry into the reactors. In a preferred embodiment, said pumping means are membrane pumps. Using membrane pumps for transferring a catalyst slurry to a polymerization reactor is advantageous as it allows use of a pressure difference between catalyst slurry vessel and the polymerization reactor. Installation of a lower pressure in the catalyst slurry vessel compared to the polymerization reactor will avoid that catalyst slurry is transferred unnecessary and/or in an uncontrolled manner to the polymerization reactor. This provides a safety means for avoiding run-away reactions in the polymerization reactor.

Preferably, there is continuous flushing of the conduit downstream the membrane pump to the reactor by means of diluent flushing means, preferably isobutane flushing means. The conduit upstream the pump may be flushed discontinuously, by means of isobutane flushing means. Different conduits may be provided for connecting the mixing vessel to the reactor.

The present invention is particularly applicable to operating a pressurized mud pot. A mud pot can be pressurized by blanketing the ethylene polymerization catalyst slurry with an inert gas such as nitrogen. Blanketing of the ethylene polymerization catalyst slurry with an inert gas is advantageous as it avoids that traces of oxygen cause solid catalyst particles to react or sparks cause diluent to explode. Building up a pressure with an inert gas in the mud pot is advantageous as it facilitates the transport of the ethylene polymerization slurry. It provides a piston effect. In a preferred embodiment of a method according to the invention, a pressure of between 4 barg and 16 barg is obtained in the above mentioned mud pot by blanketing of said catalyst slurry with nitrogen. In a more preferred embodiment of a method according to the invention, a pressure of between 7 barg and 11 barg is obtained in the above mentioned mud pot by blanketing of said catalyst slurry with nitrogen. In a most preferred embodiment of a method according to the invention, a pressure of around 9 barg is obtained in the above mentioned mud pot by blanketing of said catalyst slurry with nitrogen.

The conduits are further provided with diluent flushing means, preferably isobutane flushing means, either at the inlet, at the outlet or at both sides of the membrane pumps. Isobutane flushing means enable to flush isobutane through the conduit and to keep the conduits and the pumping means unplugged.

EXAMPLES

The above aspects and embodiments are further supported by the following non-limiting examples as illustrated by FIG. 1.

Example 1

This example describes the transition from a first metallocene catalyst to a second metallocene catalyst in the polymerization of ethylene. These metallocene catalysts are compatible.

A first mud pot capable of holding 300 kg of catalyst was loaded with a first metallocene catalyst. Commercially available catalyst was used. The catalyst was fed to a mixing vessel in form of a slurry. The slurry was prepared by mixing the metallocene catalyst from the mud pot with a first diluent, in particular isobutane. A polymerization was performed in a double loop ethylene polymerization reactor. The polymerization reaction ran using metallocene catalyst for a period of 1 day. The feed of ethylene to the polymerization reactors was lowered in order to reduce the ethylene concentration in the reactors by 20%, prior to the introduction of a second metallocene catalyst. The catalyst concentration in the mixing vessel was adjusted by increasing the isobutane feed to the maximum value of 170 kg/h. The catalyst concentration obtained in the mixing vessel was at most 0.6%. A second mud pot was loaded with the second metallocene catalyst. Commercially available catalyst was used. The second catalyst was fed to the mixing vessel in form of a concentrated slurry. The slurry was prepared by mixing the second metallocene catalyst from the second mud pot with a second diluent, in particular isobutane. The feed of the first catalyst slurry to the mixing vessel was stopped. The first metallocene catalyst was not deactivated prior to the introduction of the metallocene catalyst. The second catalyst was fed to the polymerization reactor. The ethylene feed was raised back to the nominal capacity.

Example 2

The hereunder-described device, illustrated by FIG. 1, corresponds to equipment suitable for carrying out the method of the invention. Example 2 will illustrate the use of a method of the invention for the sequential feeding of at least two compatible ethylene polymerization catalysts in an ethylene polymerisation reactor plant.

A metallocene catalyst is solid and is generally provided under a dry form in commercially available packaging. Depending on the diluent used, it may be required to bring the catalyst under higher pressure conditions than present in the packaging they are supplied in. This is for instance the case when isobutane is used, since this diluent is only liquid at higher pressure levels. In case for instance hexane is used as diluent, pressurization is not required, since this diluent is liquid at low pressures. Preferably pressurizeable containers are used. Pressurizeable containers 47 may be suitable for direct use and coupling to an inlet provided on the mud pot. Use of a larger size, pressurizeable containers 47 for transportation and supply is therefore preferred.

According to a preferred embodiment, the metallocene catalyst is provided directly from the container 47 in which it was transported to a mud pot 2. Said catalyst supply vessel is a commercial container that is suitable for handling higher pressure comprised between 1.1 barg and 16 barg, and preferably of 10 barg. In a preferred embodiment, the catalyst can be off-loaded from the container by applying a gravitational force. In other words an outlet opening is provided on said container at the bottom of said container which is suitable for connecting to the inlet opening on said mud pot. Purging is preferably performed by means of nitrogen and venting to a flare (not illustrated).

A catalyst slurry is prepared in a mud pot 2. The catalyst slurry comprises solid catalyst in a hydrocarbon diluent. When using a metallocene catalyst, hydrocarbons such as hexane or isobutane can be used to dilute the catalyst and to obtain a catalyst slurry. However, a major disadvantage of using hexane as diluent to prepare the catalyst is that a portion of hexane generally ends up in the final polymer product, which is undesirable. Isobutane on the other hand is easier to handle, to purify and to re-use in the polymerization process than hexane. For instance, since in the polymerization process of ethylene, isobutane is applied as diluent in the reaction, isobutane used as diluent for the catalyst can easily be re-used in the polymerization process. Therefore, in a preferred embodiment, isobutane is used as diluent for the metallocene catalyst. In a particularly preferred embodiment, pure isobutane is used to prepare the catalyst. Isobutane is generally present in gaseous form at a temperature of about 20° C. and at atmospheric pressure. In other to obtain liquid isobutane for preparing the catalyst slurry, increased pressures need to be obtained. Therefore, the solid catalyst particles are provided to a mud pot 2, and later on to a mixing vessel 3, wherein in the mixing vessel an increased pressure, preferably comprised between 2 and 16 barg, and more preferably between 3 and 7 barg, and most preferably of 5 barg can be applied.

Still referring to FIG. 1, the transfer of the metallocene catalyst from the catalyst supply vessel 47 to the mud pot 2 is preferably done by gravity. Before transferring the metallocene catalyst from the catalyst supply vessel 47 to the mud pot 2, isobutane is admitted into the mud pot 2. The mud pot 2 is provided with an inlet 17 for supply of this diluent. The diluent is filled in the mud pot 2, and the catalyst supply vessel 47 is emptied. To avoid catalyst remains in the catalyst supply vessel 47, the vessel is flushed with isobutane, such that remaining catalyst is transferred to the mud pot 2. The mud pot 2 is not agitated by means of stirring or mixing means to allow the metallocene catalyst to settle. Preparing concentrated catalyst slurry advantageously enables the use of small sized mud pots keeping investment expenditures limited.

After sedimented metallocene catalyst slurry has been prepared in the mud pot 2, the catalyst slurry is transferred from the mud pot 2 to the mixing vessel 3. The transfer can take place manually or automatically. Preferably the transfer of catalyst slurry from the mud pot 2 to the mixing vessel 3 is performed by means of conduits 6 controlled by transfer means. Said transfer means preferably comprise a metering valve 9. The mixing vessel 3 is kept liquid full of catalyst slurry.

The amount of catalyst encompassed in the mixing vessel 3 may vary. In a preferred embodiment, the mixing vessel 3 is fed with metallocene catalyst from the mud pot 2, and diluted by fresh diluent in order to obtain a catalyst concentration suitable for feeding to an ethylene polymerization reactor. Preferably catalyst slurry comprising solid catalyst in a hydrocarbon diluent has a concentration comprised between 0.1 and 10% by weight, and even more preferred having a concentration comprised between 0.5 and 5% by weight, and even more preferred between 1 and 3% by weight of catalyst by weight of diluent.

The catalyst slurry level in the mud pot 2 is determined by measuring the position of the level of diluent in the mud pot 2, for instance using a Time Domain Reflectometer 80 provided with guiding means 83. By means of this device the level of diluent 34 as well as the level of the interface formed between diluent and sedimented catalyst slurry 35 may be measured. Preferably the mud pot 2 has a cylindrical body 39 and a frustoconical bottom portion 36 with an opening angle α. This geometry is advantageous for enhancing the sedimentation of solid catalyst in the liquid diluent. A liquid diluent inlet 32 is provided in the form of a tube extending into the cylindrical body 39 of the mud pot. A tube for the inlet of catalyst 27 is provided in the middle of the top of the mud pot.

The mud pot 2 is preferably large enough to contain sufficient catalyst slurry and large enough such that a day vessel capacity is equivalent to the time to prepare a new batch. This enables to assure the continuous production and availability of the catalyst in the polymerization reaction. In addition, in another preferred embodiment, the pressure in the mud pot 2 is preferably maintained between 4 and 16 barg, preferably 7 and 11 barg and preferably at around 9 barg.

The conduits 6, 7 are interconnected by means of connecting lines 8. Such lines 8 enable that the different storage vessels 2 can be used in accordance with all provided conduits 6, 7. For instance, as represented in FIG. 1, in case two storage vessels 2 are provided, each having a conduit 6 or 7, the conduit 6 for transferring said catalyst from a first storage vessel 2 to a mixing vessel 3 is interchangeable with a second conduit 7 for transferring said catalyst from a second storage vessel 2 to a mixing vessel 3 through lines 8 connecting said first 6 with said second 7 conduit. Such interconnection permits, in case of interruption of catalyst transfer through one conduit 6, to discharge the catalyst to the mixing vessel 13 through a second conduit 7.

Still referring to FIG. 1, the metallocene catalyst slurry is subsequently transferred from the mixing vessel 3 to the ethylene polymerization reactor 1 through one or more conduits 4. The conduits 4 preferably have a diameter comprised between 0.3 and 2 cm, and preferably between 0.6 and 1 cm. Each conduit 4 is provided with a pumping means 5, which controls the transfer and injection of the metallocene catalyst slurry into the ethylene polymerization reactor 1. In a preferred embodiment, said pumping means are diaphragm pumps. In another preferred embodiment, said reactor is a double loop reactor with two loop reactors are connected in series.

Still referring to FIG. 1, the supply of diluent from conduit 24 to conduit 6 is increased, decreasing the concentration of metallocene catalyst transported to the mixing vessel 3 and to the polymerization reactor 1.

A second mud pot 2, loaded with a second metallocene catalyst is connected by means of conduit 7 to mixing vessel 3.

The supply of diluent from conduit 24 to conduit 6 is increased. The second metallocene catalyst is transferred from the mud pot 2 to the mixing vessel 3. Supply of metallocene catalyst is interrupted. The second metallocene catalyst gradually replaces the first metallocene catalyst. The supply of diluent from conduit 24 to conduit 6 is decreased, thereby increasing the flow rate of metallocene catalyst to mixing vessel 3. Catalyst concentration in the mixing vessel is kept at a minimum of 0.1 weight %.

The ethylene polymerization reactor 1 is continuously fed with an ethylene polymerization catalyst slurry from the mixing vessel. There is no requirement for a dilution or concentration step prior to injection of the catalyst slurry into the reactor 1. The catalyst slurry is prepared by bringing together a liquid diluent and a solid catalyst in a concentration suitable for use in a polymerization reactor. A suitable concentration for use in an ethylene polymerization reaction is preferably comprised between 0.1% and 10%, more preferably comprised between 0.5% and 5%, most preferably between 1% and 3%, expressed in catalyst weight by weight of diluent.

The conduits 4 are further provided with isobutane flushing means, either at the inlet 30, at the outlet 33 or at both sides of the membrane pumps 5, as illustrated on FIG. 1. isobutane flushing means 30, 33 enable to flush isobutane through the conduit 4 and to keep the conduits 4 and the pumping means 5 unplugged. Preferably, there is continuous flushing of the conduit 4 downstream the membrane pump 5 to the reactor 1 by means of isobutane flushing means 33. The conduit 4 upstream the pump 5 may be flushed discontinuously, by means of isobutane flushing means 30. When different conduits 4 are provided for connecting the mixing vessel 3 to the reactor 1, generally, one conduit having one active pumping means 5 will be operative, while the other conduits 4 and pumping means 5 will not be operative but will be kept in stand by mode. In this latter case, the conduit 4 downstream the pump 5 will preferably be flushed with a suitable stream of diluent. The conduit 4 upstream the pump 5 may be discontinuously flushed. In addition, two-way valves 31 can be installed on the conduits 4, in order to never stop the pumping means 5.

It is important to correctly control the metallocene catalyst flow rate to the reactor and to pump catalyst slurry into the reactor at a controlled and limited flow rate. An unexpected flow rate to the reactor could lead to a runaway reaction. A fluctuating flow to the reactor could lead to reduced efficiency and fluctuations in product quality. Therefore, in a particularly preferred embodiment, the injection pump 5 flow rates are controlled by the reactor 1 activity.

The pumping means are in particular controllable in function of the concentration of a reactant in said reactor. Preferably said reactant is the concentration of monomer, i.e. ethylene, in the reactor. However, it should be clear that the membrane pumps are controllable in function of the concentration of other reactants, such as e. g. the co-monomer or hydrogen concentrations in the reactor as well. By the use of membrane pumps 5 the invention provides for a good control catalyst flow. In particular, the metallocene catalyst flow rate to the reactors is controlled by adjusting the stroke and/or frequency of the membrane pumps.

Furthermore, the pump flow rates are controlled by the ethylene concentration in the reactor. In case the ethylene concentration is high in the reactor, more catalyst will be added to the reactor and vice versa. In this way, the variations in ethylene polymerization rate are taken into account and actual production rate and product properties do not fluctuate significantly. Variations in ethylene polymerization rate are taken into account and polymerization reactions under optimal catalyst feeding conditions can be obtained.

The catalyst transition system may be further provided with a activating agent distribution system, for bringing a suitable amount of activating agent into contact with the catalyst slurry for a suitable period of time before supplying said catalyst slurry to said reactor. When using a metallocene catalyst, tri isobutyl aluminium (TIBAL) is preferably used as activating agent. When using a Ziegler-Natta catalyst, tri isobutyl aluminium (TIBAL) is preferably used as activating agent.

Catalyst wastes can be sent to a dump vessel 28, which is preferably provided with stirring means 25 and contains mineral oil for neutralization and elimination. The dump is provided with a heated vessel, e. g. steam jacket, where the isobutane is evaporated and sent to distillation or to the flare. Catalyst wastes can be sent through a conduit 29, 23, which is provided with a control valve, to one or more dump vessels 28.

Activating agents are generally provided in commercial containers. In a storage vessel of the activating agent distribution system 11, the TIBAL activating agent is generally provided in a solution of hexane or heptane, but can be provided in pure form too. The TIBAL activating agent is transferred from the storage vessel through an activating agent injection conduit 12, in the conduit 4, which connects the mixing vessel 3 with the reactor 1. Conduit 12 intersects conduit 4, downstream the diaphragm pumps 5 and upstream the reactor 1. In case a flow measuring means 10 is further provided on the conduits 4, the activating agent feeding conduit 12 preferably intersects the conduit 4, downstream of said flow meter 10 and upstream the reactor 1.

In case the TIBAL activating agent is injected in the conduit 4, the injection point is at a distance from the reactor allowing a certain pre-contact time with the catalyst before being supplied to the reactor. In order to have a sufficient pre-contact time, preferably between 5 seconds and 1 minute, between the metallocene catalyst slurry and the TIBAL activating agent, each conduit 4 is provided with a contact vessel 13, preferably downstream the injection point of the co-catalyst distribution system, for enhancing the contact time of said activating agent with said catalyst slurry in the conduits 4. These contact vessels 13 can be agitated or not. In another preferred embodiment, the conduits 4 have an inner diameter comprised between 0.3 and 2 cm, and preferably comprised between 0.6 and 1 cm while the diameter of the contact vessels 13 is preferably comprised between 1 and 15 cm and preferably between 6 and 9 cm.

The catalyst slurry is injected under controlled flow rate into the reactor. The conduits 4 for transferring catalyst slurry into to the reactor are equipped by one or more valves, preferably piston valves 22. The piston valves 22 are capable of sealing the orifice by which the conduit 4 is connected to the reactor 1. When using different conduits 4 for transferring catalyst slurry to one reactor, only in one conduit 4 the pumps actively pump catalyst slurry to the reactor, while in other conduits 4 the pumps are not active and the conduits are preferably flushed by isobutane.

The invention claimed is:

1. Method for optimizing the sequential feeding of at least two ethylene polymerization catalysts to an ethylene polymerization reactor, comprising:

transferring to a mixing vessel a first ethylene polymerization catalyst and a first diluent, decreasing the concentration of said first ethylene polymerization catalyst in said mixing vessel, transferring to said mixing vessel a second ethylene polymerization catalyst and a second diluent, progressively replacing said first ethylene polymerization catalyst by said second ethylene polymerization catalyst and said first diluent by said second diluent, increasing the concentration of said second ethylene polymerization catalyst in said mixing vessel, sequentially transferring said first ethylene polymerization catalyst and said second ethylene polymerization catalyst from said mixing vessel to an ethylene polymerization reactor.

2. Method according to claim 1, whereby said first diluent is the same as said second diluent.

3. Method according to claim 1, whereby increasing or decreasing a concentration is obtained by raising or lowering of said first diluent or said second diluent transferred to said mixing vessel.

4. Method according to claim 1, whereby decreasing said concentration of said first ethylene polymerization catalyst in said mixing vessel, is obtained by increasing the relative amount of said first diluent to said first ethylene polymerization catalyst in said mixing vessel.

5. Method according to claim 1, whereby increasing said concentration of said second ethylene polymerization catalyst in said mixing vessel, is obtained by lowering the relative amount of said second diluent to said second ethylene polymerization catalyst in said mixing vessel.

6. Method according to claim 1, whereby sequentially transferring said first ethylene polymerization catalyst and said second ethylene polymerization catalyst is providing said ethylene polymerization reactor with a catalyst concentration suitable for the production of polyethylene when producing said polyethylene.

7. Method according to claim 1, whereby said first and/or said second diluent is injected into a conduit for transferring said first ethylene polymerization catalyst and/or said second ethylene polymerization catalyst to said mixing vessel.

8. Method according to claim 1, whereby said first ethylene polymerization catalyst is replaced by said second ethylene polymerization catalyst upon reaching a pre-set catalyst concentration in said mixing vessel suitable for polymerizing ethylene.

9. Method according to claim 8, whereby said pre-set catalyst concentration is a catalyst concentration, expressed per weight of diluent in said mixing vessel, of between 0.05 and 2.9 weight percent.

10. Method according to claim 9, further comprising the step of lowering ethylene in said ethylene polymerization reactor prior to progressively replacing said first ethylene polymerization catalyst by said second ethylene polymerization catalyst.

11. Method according to claim 10, further comprising the step of: transferring said first ethylene polymerization catalyst and/or said second ethylene polymerization catalyst from said mixing vessel to said ethylene polymerization reactor at a flow rate adjusted to said ethylene.

12. Method according to claim 10, whereby said ethylene is lowered by at least two percent.

13. Method according to claim 1, further comprising the step of: lowering hydrogen and/or co-monomer in said ethylene polymerization reactor.

14. Method according to claim 1, whereby said first ethylene polymerization catalysts and said second ethylene polymerization catalyst are selected from a list consisting of a metallocene catalyst, a Ziegler-Natta catalyst and a chromium catalyst, and whereby said first ethylene polymerization catalyst is different from said second ethylene polymerization catalyst.

15. Method according to claim 1, whereby said first ethylene polymerization catalyst is replaced by said second ethylene polymerization catalyst within at most 2 hours.

16. Method according to claim 1, whereby the first diluent comprises isobutane.

17. Method according to claim 6, wherein the ethylene polymerization reactor is a double loop reactor.

18. Method according to claim 6, wherein the polyethylene is bimodal polyethylene.

19. Method according to claim 9, wherein the catalyst concentration, expressed per weight of diluent in said mixing vessel, is between 0.1 and 0.3 weight percent.

20. Method according to claim 9, wherein the catalyst concentration, expressed per weight of diluent in said mixing vessel, is 0.2 weight percent.

21. Method according to claim 12, whereby the ethylene is lowered by at least 5 percent.

22. Method according to claim 12, whereby the ethylene is lowered by at most 10 percent.

23. Method according to claim 14, whereby either the first ethylene polymerization catalysts or the second ethylene polymerization catalyst is a single site catalyst.

24. Method according to claim 14, whereby either the first ethylene polymerization catalysts or the second ethylene polymerization catalyst is a metallocene catalyst.

25. Method according to claim 14, whereby either the first ethylene polymerization catalysts or the second ethylene polymerization catalyst is a carrier supported metallocene catalyst.

26. Method according to claim 15, whereby the first ethylene polymerization catalyst is replaced by the second ethylene polymerization catalyst within at most 1.5 hours.

27. Method according to claim 15, whereby the first ethylene polymerization catalyst is replaced by the second ethylene polymerization catalyst within at most 1 hour.

* * * * *